UNITED STATES PATENT OFFICE 2,417,057

SULFONIUM COMPOUNDS

Edgar C. Britton and John N. Hansen, Midland, Mich., assignors to The Dow Chemical Company, Midland, Mich., a corporation of Michigan No Drawing. Application December 26, 1944, Serial No. 569,933

3 Claims. (Cl. 260—457)

This invention relates to new sulfonium compounds and particularly those comprising an aromaticoxy-polyalkylene ether grouping. We have prepared representative members of this class of compounds and found them to be viscous oils.

A wide variety of materials have been suggested for use as bactericides, antiseptics, and fungicides. These substances vary greatly with respect to their physical and chemical properties. Some are objectionable because of odor, instability, toxicity, or tendencies to irritate the skin of humans when contacted therewith. Others have solubility characteristics which make their use in aqueous compositions impractical, except as they may be employed in combination with excessive amounts of wetting, dispersing, or solubilizing agents. Still other compounds have relatively high vapor pressures, whereby they volatilize from compositions in which they are employed or out of contact with the surfaces to which they are applied, so that extended protection against microorganisms is not obtained.

The new compounds of the present invention are characterized by a fortunate combination of properties whereby they are adequately soluble in water, of high germicidal and bactericidal effectiveness, substantially odorless, of low volatility, stable, and relatively non-irritating to the skin of humans and higher animals. These compounds have been found valuable for the control of micro-organisms.

One method for the preparation of the compounds of the present invention includes condensing a phenol with a suitable dihalo-polyalkylene ether in the presence of sodium hydroxide to form a compound of the formula

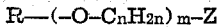
R—(-O-CnH2n)m-Z wherein R is an aromatic radical of the benzene series, Z represents halogen, and m and n are each an integer from 2 to 4, inclusive. Such product is then reacted with a suitable sodium mercaptide to form a sulfide of the formula

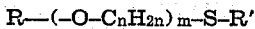
R—(-O-CnH2n)m-S-R' wherein R, m and n have the values set forth above, and R' represents alkyl or aralkyl. Such sulfide is then reacted with a suitable alkyl ester and preferably an ester of an inorganic acid to give a sulfonium compound of the formula

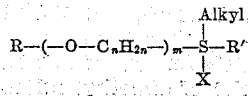

wherein R represents an aromatic radical of the benzene series, R' represents alkyl or aralkyl, m and n are each an integer from 2 to 4, inclusive, and X represents a mono-basic acid radical. The expression "alkyl" refers particularly to radicals containing from 1 to 18 carbon atoms, inclusive. The expression "of the benzene series" as herein employed in the definition of the symbol "R" refers to mononuclear aromatic structures characterized by the phenyl ring and homologues and analogues thereof in distinction to heterocyclic structures and condensed polynuclear radicals containing several benzene nuclei linked together in such manner that each pair possesses 2 carbon atoms in common, as in naphthyl, phenanthryl, etc.

The prefered embodiments of the present invention include compounds of the foregoing formula in which R represents a hydrocarbon-substituted phenyl structure of the formula

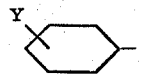

Here, Y represents hydrocarbon and particularly aralkyl, cyclohexyl, phenyl, or alkyl. These compounds are particularly suited for use in bactericidal and antiseptic compositions. A further embodiment resides in those compounds in which R represents the structure

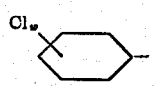

In this formula, w is an integer from 1 to 5, inclusive. These compounds are good as fungicides. Other preferred features of the generic structure, as set forth above, include compounds in which the polyalkylene ether grouping consists of a plurality of ethoxy radicals and preferably 2, and in which one of the hydrocarbon radicals attached to sulfur is methyl.

The following examples illustrate the invention, but are not to be construed as limiting.

*Example 1*

20 grams (0.5 mole) of sodium hydroxide was dissolved in a mixture of 35 milliliters of water and 400 milliliters of ethanol. 45 grams (0.5 mole) of normalbutyl mercaptan and 138 grams (0.5 mole) of beta-chloro-beta'-(2-xenoxy)-diethyl ether were added to the caustic solution and the mixture heated to boiling temperature and under reflux for 7 hours. The resulting product was diluted with water to dissolve the sodium chloride formed and thereafter extracted with benzene. The benzene extract was washed successively with dilute aqueous sodium hydroxide and water and the benzene separated by distillation under reduced pressure. The residue consisted of normalbutyl beta-[beta-(2-xenoxy)-ethoxy]-ethyl sulfide as a straw-colored oil.

33 grams (0.1 mole) of the sulfide as described above and 12.6 grams (0.1 mole) of dimethyl sulfate were mixed together and heated at 72° C. for 42 hours. The reaction mixture was then dissolved in a small amount of absolute ethanol and thereafter diluted with diethyl ether to throw out of solution the sulfonium reaction products as an oil. This operation was repeated several times, the oil separated, and the last traces of solvent removed by warming the product under reduced pressure. Normalbutyl methyl beta-[beta-(2-xenoxy)-ethoxy]-ethyl sulfonium methosulfate was thereby obtained in the form of a clear viscous oil. This compound is readily soluble in ethanol, water, and benzene, and relatively insoluble in diethyl ether.

Example 2

In a similar manner normalbutyl mercaptan and beta-[beta-(2.3.4.6 - tetrachloro - phenoxy)-ethoxy]-ethyl chloride were reacted together in the presence of sodium hydroxide to obtain normalbutyl beta-[beta-(2.3.4.6-tetrachloro - phenoxy)-ethoxy]-ethyl sulfide. 78.4 grams (0.2 mole) of this sulfide and 25.2 grams (0.2 mole) of dimethyl sulfate were mixed together and heated at 70° C. for approximately 18 hours. The crude reaction product was dissolved in a small amount of absolute ethanol and thereafter thrown out of solution as an oil by dilution with diethyl ether. The oily product was separated by decantation, and the procedure repeated. The ultimate residue was warmed under reduced pressure to remove residual solvent. The product from this operation consisted of normalbutyl methyl beta-[beta - (2.3.4.6-tetrachloro - phenoxy)-ethoxy]-ethyl sulfonium methosulfate as a light viscous oil readily soluble in water, ethanol, and benzene, and insoluble in diethyl ether.

Example 3

Equimolecular proportions of beta-[beta-(4-cyclohexyl-phenoxy)-ethoxy]-ethyl chloride and normalbutyl mercaptan were reacted together in the presence of an equivalent proportion of sodium hydroxide dissolved in 90 per cent ethanol substantially as described in Example 1. 50.4 grams (0.15 mole) of the resulting normalbutyl beta - [beta - (4 - cyclohexyl-phenoxy)-ethoxy]-ethyl sulfide and 18.9 grams (0.15 mole) of dimethyl sulfate were mixed together and heated at 70° C. for 21 hours. The usual purification steps of dissolving in absolute alcohol and precipitation with diethyl ether were followed and the ultimate insoluble residue warmed under reduced pressure to remove traces of solvent. The product from this treatment consisted of 53 grams of normalbutyl methyl beta-[beta-(4-cyclohexyl-phenoxy)-ethoxy]-ethyl sulfonium methosulfate as a viscous straw-colored liquid completely miscible with water, soluble in absolute ethanol, and insoluble in diethyl ether.

Example 4

90 grams (1 mole) of normalbutyl mercaptan, 40 grams (1 mole) of sodium hydroxide, 380.5 grams of beta-[beta-(x-alphaphenylethyl-2-xenoxy)-ethoxy]-ethyl chloride, 75 milliliters of water, and 1 liter of ethanol were mixed together and heated to boiling temperature and under reflux for 22 hours. The major proportion of the ethanol was then recovered by fractional distillation under reduced pressure and the residue from the distillation operation diluted with water to dissolve precipitated sodium chloride. The mixture was then extracted with benzene, and the benzene distilled off to recover as a residue 421 grams of normalbutyl beta-[beta-(x-alphaphenylethyl-2-xenoxy)-ethoxy]-ethyl sulfide as a straw-colored viscous oil.

86.8 grams (0.2 mole) of this sulfide and 25.2 grams (0.2 mole) of dimethyl sulfate were reacted together and heated at 70° C. for 21 hours. The crude reaction product was dissolved in a small amount of ethanol and thereafter diluted with diethyl ether to throw out of solution the sulfonium reaction product. This oily product was separated by decantation, washed with diethyl ether, and warmed under reduced pressure to remove traces of solvent. From these operations there was obtained 103 grams of normalbutyl methyl beta-[beta-(x-alphaphenylethyl-2-xenoxy)-ethoxy]-ethyl sulfonium methosulfate as a straw-colored viscous oil completely soluble in water and ethanol, and relatively insoluble in diethyl ether.

Example 5

43.4 grams (0.1 mole) of the sulfide as described in Example 4 and 18.6 grams (0.1 mole) of methyl-paratoluene-sulfonate were mixed together and heated at 98° C. for 40 hours. The resulting crude product was dissolved in ethyl alcohol and thereafter precipitated as a viscous oil by the addition of a small amount of water to the alcohol mixture. This oily product was dried to obtain a substantially theoretical yield of normalbutyl methyl beta-[beta-(x-alphaphenylethyl-2-xenoxy)-ethoxy]-ethyl sulfonium paratoluenesulfonate as a viscous liquid soluble in ethanol, and difficultly soluble in water and diethyl ether.

Example 6

43.4 grams (0.1 mole) of the sulfide described in Example 4 and 14.2 grams (0.1 mole) of methyl iodide were mixed together and allowed to stand under autogenous pressure at 25°–30° C. for 46 hours. The resulting crude product was purified by dissolving in ethanol and precipitation with diethyl ether in the usual manner to obtain normalbutyl methyl beta-[beta-(x-alphaphenylethyl-2-xenoxy)-ethoxy]-ethyl sulfonium iodide as a very viscous liquid soluble in ethanol and relatively insoluble in diethyl ether and water.

Example 7

310 grams (1.0 mole) of beta-[beta-(monochloro-2-xenoxy)-ethoxy]-ethyl chloride, 90 grams (1 mole) of normalbutyl mercaptan, 40 grams (1 mole) of sodium hydroxide, 75 milliliters of water, and 800 milliliters of ethanol were mixed and reacted together substantially as described in Example 1 for 12 hours at the boiling temperature of the mixture and under reflux. As the product from this reaction there was obtained 360 grams of normalbutyl beta-[beta-(monochloro-2-xenoxy)-ethoxy]-ethyl sulfide as a light viscous oil, very soluble in benzene, and difficultly soluble in water.

360 grams (0.998 mole) of this sulfide and 126 grams (1.0 mole) of dimethyl sulfate were mixed together. Considerable heat of reaction was evolved and the mixture was allowed to stand at room temperature for 18 hours. The resulting crude product was warmed on a steam bath, dissolved in approximately 150 milliliters of absolute alcohol, and cooled. The solution was then diluted with diethyl ether to throw out normal-butyl methyl beta-[beta-(monochloro-2-xenoxy)-ethoxy]-ethyl sulfonium methosulfate as a viscous light colored oil. This purification step with ethanol and ether was repeated several times and the ultimate residue warmed under reduced pressure to remove traces of solvent. The desired sulfonium compound was thereby obtained as a relatively viscous oil, readily soluble in water, ethanol, and benzene, and difficultly soluble in diethyl ether.

*Example 8*

49.15 grams (0.1 mole) of the sulfonium methosulfate salt as described in the preceding example was dissolved in 200 milliliters of water. A solution of 16 grams (0.1 mole) of sodium salicylate in 75 milliliters of water was added to the solution with stirring. A clear straw-colored oil separated from solution and was recovered by extraction with ethylene chloride. The solvent was evaporated off to obtain 51 grams of normalbutyl methyl beta-[beta-(monochloro-2-xenoxy)-ethoxy]-ethyl sulfonium salicylate as a viscous oil having a strong odor of wintergreen, soluble in ethanol, ethyl ether, and benzene, and relatively insoluble in water, petroleum ether, and carbon tetrachloride.

*Example 9*

27.6 grams of alphaphenylethyl mercaptan was added portion-wise and with stirring to a solution of 8.34 grams of sodium hydroxide in 15 milliliters of water. A white solid formed. This product was added along with 76.1 grams of beta - [beta - (x-alaphaphenylethyl-2-xenoxy)-ethoxy]-ethyl chloride to 200 milliliters of 95 per cent ethanol and the mixture heated to boiling temperature and under reflux for 24 hours. The resulting crude reaction product was cooled, diluted with water, and extracted with benzene. The benzene extract was successively washed with dilute aqueous sodium hydroxide and water and the benzene evaporated off under reduced pressure. The residue consisted of 97 grams of alphaphenylethyl beta-[beta-alphaphenylethyl-2-xenoxy)-ethoxy]-ethyl sulfide as a straw-colored oil.

45 grams of the foregoing sulfide and 11.8 grams of dimethyl sulfate were mixed together and heated at 65° C. for 55 minutes. The reaction product was then dissolved in absolute ethanol and the sulfonium salt thrown out of solution by dilution with diethyl ether. The mixed solvents were decanted off and the oily residue washed with diethyl ether and warmed under reduced pressure to remove traces of solvent. The product from the reaction consisted of 38 grams of methyl alphaphenylethyl beta-[beta - (x-alphaphenylethyl-2-xenoxy)-ethoxy]-ethyl sulfonium methosulfate soluble in ethanol and insoluble in diethyl ether. The product was completely soluble in water to give a clear foaming solution.

*Example 10*

In a similar manner, alphaphenylethyl mercaptan was reacted with beta-(4-cyclohexylphenoxy)-beta'-chlorodiethyl ether to produce alphaphenylethyl beta - [beta - (4 - cyclohexyl-phenoxy)-ethoxy]-ethyl sulfide as a yellow oil. 38.4 grams (0.1 mole) of this sulfide and 12.6 grams (0.1 mole) of dimethyl sulfate were mixed together and heated at 65° C. for 40 minutes. The crude reaction product was dissolved in 20 milliliters of absolute alcohol and thereafter thrown out of solution by dilution with 400 milliliters of diethyl ether. The mixed solvents were decanted off and the residue washed with ether and dried under reduced pressure. As a residue there was obtained 30 grams of methyl alpha-phenyl-ethyl beta - [beta - (4-cyclohexyl-phenoxy)-ethoxy]-ethyl sulfonium methosulfate as a clear viscous oil dissolving in water to give a clear, foamy, and slightly viscous solution.

*Example 11*

Normalbutyl mercaptan and beta-(2.4.5-trichloro - phenoxy) - beta'-chloro-diethyl ether were reacted together in the presence of sodium hydroxide to produce normalbutyl beta-[beta-(2.4.5 - trichloro-phenoxy)-ethoxy]-ethyl sulfide as a colorless oil. 143 grams (0.4 mole) of this sulfide and 50.4 grams (0.4 mole) of dimethyl sulfate were mixed together. Heat of reaction was developed and the viscous mixture was heated at 60° C. for 19 hours. The reaction product consisted essentially of normalbutyl methyl beta-[beta - (2.4.5-trichloro-phenoxy)-ethoxy]-ethyl sulfonium methosulfate as a clear oil, rather viscous at room temperature, and completely soluble in water to give a colorless, foamy solution.

*Example 12*

0.2 molar quantities of sodium hydroxide and beta - (x - alphaphenylethyl-2-xenoxy)-beta'-chloro-diethyl ether were reacted with a keryl mercaptan obtained as a commercial product prepared from kerosene and embodying an average alkyl group of $C_{13}$. (This keryl mercaptan contained 11.5–12.5 per cent sulfur and had a boiling range of 75°–180° C. at 5 millimeters pressure.) The reaction was carried out in 95 per cent ethanol and at boiling temperature and under reflux for 24 hours. The usual dilution of the crude reaction mixture with water and extraction with benzene was carried out. As the product of reaction there was obtained 110 grams of keryl beta-[beta-(x-alphaphenylethyl-2-xenoxy)-ethoxy]-ethyl sulfide as a viscous amber oil of not unpleasant odor.

56 grams (0.1 mole) of the above sulfide product and 15.1 grams (0.12 mole) of dimethyl sulfate were mixed and heated at 65° C. for 19 hours. After the usual purification of the crude oily product with ethanol and ether, there was obtained 43 grams of keryl methyl beta-[beta-(x-alpha-phenyl-ethyl-2-xenoxy)-ethoxy]-ethyl sulfonium methosulfate as a dark viscous oil completely soluble in water, soluble in ethanol, and insoluble in diethyl ether.

*Example 13*

Equimolecular proportions of a commercial mixed amyl mercaptan product and beta-(2.3.4.6-tetrachloro-phenoxy)-beta'-chloro-diethel ether were reacted together in alcohol and water and in the presence of sodium hydroxide substantially as described in the previous examples. The product was purified in the usual manner to obtain 398 grams of amyl beta-[beta-(2.3.4.6-tetrachloro-phenoxy)-ethoxy]-ethyl sulfide as a yellow viscous liquid. 203 grams of this sulfide product and 63 grams of dimethyl sulfate were mixed together and heated for 16 hours on a steam bath. The resulting product consisted essentially of amyl methyl beta-[beta-(2.3.4.6-tetrachloro-phenoxy)-ethoxy]-ethyl sulfonium methosulfate as a clear brown syrup, rather viscous at reduced temperatures, and completely soluble in water.

*Example 14*

0.25 molar proportion of sodium hydroxide, lauryl mercaptan and beta-(4-cyclohexyl-phenoxy)-beta'-chloro-diethyl ether were reacted together in a mixture of 18 milliliters of water and 200 milliliters of 95 per cent ethanol. The usual steps of heating under reflux, extraction and washing were carried out to obtain 112 grams of lauryl beta-[beta-(4-cyclohexyl-phenoxy)-ethoxy]-ethyl sulfide as a straw-colored oil. 44.8 grams (0.1 mole) of this sulfide and 12.6 grams (0.1 mole) of dimethyl sulfate were heated together at 65° C. for 18 hours. The resulting crude product was dissolved in diethyl ether and thereafter thrown out of solution by dilution with an excess of petroleum ether. The mixed solvents were decanted and the oily residue washed twice with petroleum ether and warmed under reduced pressure to drive off traces of solvent. As the product of reaction there was obtained 50 grams of lauryl methyl beta-[beta-(4-cyclohexyl-phenoxy)-ethoxy]-ethyl sulfonium methosulfate as a yellow-brown pasty material soluble in water.

*Example 15*

951 grams of beta-(x-alphaphenylethyl-2-xenoxy)-diethyl ether and 160 grams of a freshly distilled commercial mercaptan mixture containing 26 per cent by weight of methyl mercaptan, 59 per cent by weight of ethyl mercaptan, and 7 per cent by weight of butyl mercaptan were reacted together in the presence of 2.0 moles of sodium hydroxide dissolved in 175 milliliters of water and 2,000 milliliters of 95 per cent ethanol. The reaction was carried out by passing the mercaptan mixture into the liquid caustic solution at 5° C. and over a period of 10 minutes, and thereafter adding the diethyl ether compound. The mixture was allowed to stand overnight. The product was then heated to boiling temperature under reflux and with stirring for 24 hours. The alcohol was recovered by fractional distillation and the residue washed with water and extracted with carbon tetrachloride. The carbon tetrachloride extract was washed with water and the solvent distilled off under reduced pressure to obtain a mixed sulfide product as a clear wine colored syrup in the amount of 970 grams. This product contained 7.7 per cent by weight of sulfur.

206.5 grams of the sulfide product as obtained above and 63 grams of dimethyl sulfate were mixed together and heated at 65° C. for 2 hours. The reaction product was found to be a mixed sulfonium methosulfate as a viscous oil completely soluble in water.

*Example 16*

Other sulfonium salt compounds which may be prepared substantially as described in the foregoing examples include the following:

Ethyl methyl beta-[beta-(beta-(4-xenoxy)-ethoxy)-ethoxy]-ethyl sulfonium ethylsulfate by reacting methyl beta-[beta-(beta-(4-xenoxy)-ethoxy)-ethoxy]-ethyl sulfide with diethyl sulfate.

Dimethyl beta-[beta-(beta-(beta-phenoxy-ethoxy)-ethoxy)-ethoxy]-ethyl sulfonium bromide by reacting together methyl beta-[beta-(beta-(beta-phenoxy-ethoxy)-ethoxy)-ethoxy]-ethyl sulfide and methyl bromide.

Octadecyl propyl gamma-[gamma-(4-chlorophenoxy)-propoxy]-propyl sulfonium propyl sulfate by reacting octadecyl gamma-[gamma-(4-chlorophenoxy)-propoxy]-propyl sulfide with dipropyl sulfate.

Tertiarybutyl benzyl gamma-[gamma-(gamma-(gamma-pentachlorophenoxy-propoxy)-propoxy)-propoxy]-propyl sulfonium chloride by reacting benzyl gamma-[gamma-(gamma-(gamma-pentachlorophenoxy-propoxy)-propoxy)-propoxy]-propyl sulfide with tertiarybutyl chloride.

Isopropyl secondaryoctyl delta-[delta-(2-cyclohexyl-4-chlorophenoxy)-normalbutoxy]-normalbutyl sulfonium iodide by reacting secondaryoctyl delta-[delta-(2-cyclohexyl-4-chlorophenoxy)-normalbutoxy]-normalbutyl sulfide with isopropyl iodide.

Betaphenylethyl octadecyl delta-[delta-(delta-(delta-(2.5-dichlorophenoxy)-normalbutoxy)-normalbutoxy)-normalbutoxy]-normalbutyl sulfonium bromide by reacting betaphenylethyl delta-[delta-(delta-(delta-(2.5-dichlorophenoxy)-normalbutoxy)-normalbutoxy)-normalbutoxy]-normalbutyl sulfide with octadecyl bromide.

Normalbutyl methyl beta-[beta-(2.4-dinitro-6-methyl-phenoxy)-ethoxy]-ethyl sulfonium methosulfate by reacting dimethyl sulfate with normalbutyl beta-[beta-(2.4-dinitro-6-methyl-phenoxy)-ethoxy]-ethyl sulfide.

Normalpropyl ethyl beta-[beta-(beta-(4-secondary-butyl-phenoxy)-ethoxy)-ethoxy]-ethyl sulfonium bromide by reacting ethyl bromide with normalpropyl beta-[beta-(beta-(4-secondary-butyl-phenoxy)-ethoxy)-ethoxy]-ethyl sulfide.

Secondarybutyl ethyl beta-[beta-(2-methyl-4-tertiaryoctyl-phenoxy)-ethoxy]-ethyl sulfonium chloride by reacting secondarybutyl beta-[beta-(2-methyl-4-tertiaryoctyl-phenoxy)-ethoxy]-ethyl sulfide with ethyl chloride.

Normalhexyl methyl beta-[beta-(2.4.6-tribromophenoxy)-ethoxy]-ethyl sulfonium methosulfate by reacting normalhexyl beta-[beta-(2.4.6-tribromophenoxy)-ethoxy]-ethyl sulfide with dimethyl sulfate.

Isopropyl normalbutyl gamma-[gamma-(4-normaloctylphenoxy)-propoxy]-propyl sulfonium bromide by reacting isopropyl gamma-[gamma-(4-normaloctyl-phenoxy)-propoxy]-propyl sulfide with normalbutyl bromide.

Normalpropyl methyl beta-[beta-(4-benzyl-phenoxy)-ethoxy]-ethyl sulfonium bromide by reacting methyl beta-[beta-(4-benzyl-phenoxy)-ethoxy]-ethyl sulfide with normalbutyl bromide.

Normalbutyl methyl beta-[beta-(4-iodo-phenoxy)-ethoxy]-ethyl sulfonium methosulfate by reacting normalbutyl beta-[beta-(4-iodo-phenoxy)-ethoxy]-ethyl sulfide with dimethyl sulfate.

We claim:

1. A sulfonium compound having the formula

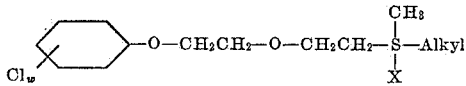

wherein $w$ represents an integer not greater than 5, and X represents a mono-basic acid radical.

2. Normalbutyl methyl beta-[beta-(2.3.4.6-tetrachlorophenoxy)-ethoxy]-ethyl sulfonium methosulfate.

3. Normalbutyl methyl beta-[beta-(2.4.5-trichlorophenoxy)-ethoxy]-ethyl sulfonium methosulfate.

EDGAR C. BRITTON.
JOHN N. HANSEN.

REFERENCES CITED

The following references are of record in the file of this patent:

UNITED STATES PATENTS

| Number | Name | Date |
|---|---|---|
| 2,204,967 | Van Peski | June 18, 1940 |
| 2,107,366 | Bruson | Feb. 8, 1938 |
| 2,121,832 | Piggott | June 28, 1938 |

FOREIGN PATENTS

| Number | Country | Date |
|---|---|---|
| 810,437 | French | Mar. 22, 1937 |

OTHER REFERENCES

Renshaw, "Jour. Am. Chem. Soc.," vol. 55, pp. 4951 to 4953 (1933).